United States Patent

[11] 3,615,694

[72] Inventor William P. O'Donnell
Cherry Hill, N.J.
[21] Appl. No. 733,781
[22] Filed June 3, 1968
[45] Patented Oct. 26, 1971
[73] Assignee Camden Food Specialties Co., Inc.
Camden, N.J.

[54] PROTEINACEOUS FLAVORING AGENT AND METHOD OF MAKING SAME
1 Claim, No Drawings

[52] U.S. Cl. .................................................... 99/140 R,
99/18
[51] Int. Cl. .................................................... A23l 1/22
[50] Field of Search .......................................... 99/18, 14,
7, 140

[56] References Cited
UNITED STATES PATENTS

| | | | |
|---|---|---|---|
| 2,953,456 | 9/1960 | Mohler et al. ................ | 99/14 |
| 3,020,160 | 2/1962 | Downing et al. ............... | 99/14 |
| 3,271,167 | 9/1966 | Perret ............................. | 99/140 |
| 3,449,315 | 6/1969 | Aikins ............................ | 99/18 X |

*Primary Examiner*—Morris O. Wolk
*Assistant Examiner*—Warren Bovee
*Attorney*—Seidel and Gonda

ABSTRACT: The water soluble protein residue from a low temperature edible beef fat-rendering process is hydrolyzed with hydrochloric acid, filtered, and the solution condensed by steam distillation to a 45 to 55 weight percent solute level. This material is filtered, and the resulting solution forms a useful proteinaceous flavoring agent for soup bases.

PROTEINACEOUS FLAVORING AGENT AND METHOD OF MAKING SAME

The present invention is directed to a proteinaceous flavoring agent and to a method of making the same. More particularly, the present invention is directed to recovering a proteinaceous flavoring agent from the waste from a low temperature edible beef fat-rendering process.

By the conventional low temperature edible beef fat-rendering process, the beef fat is rendered into tallow and a partially defatted beef fatty tissue. Such defatted beef fatty tissue is used in meat products, such as hamburgers and sausage.

The rendering process is performed on the suet or beef fat. Conventionally, this is effected by putting the beef fat through a meat grinder into a stream jacketed kettle where the temperature is brought up to 90° to 95° F. The warmed fat is then sent through a breaker, whose blades split the fat from the lean meat. The mixture of separated fat and lean meat is then conventionally heated, such as to a temperature of up to 110° F. The heated mixture is then conventionally pumped to a so-called superdecanter, which is a horizontal centrifuge, in which a centrifugal separation is effected between the fatty oil and the relatively lean meat portion. Alternatively, the relatively lean meat portion can be separated by filtration, since it is present as suspended solid particles. The relatively lean meat portion constitutes partially defatted beef fatty tissue, and may be used for hamburgers, sausage, and other meat items.

The fatty oil portion from the superdecanter is then pumped through an autoejector. In the autoejector, moisture and dissolved protein are removed from the fatty oil by centrifuging, such moisture and dissolved protein being heavier than the oil. This moisture and dissolved protein is technically known as protein sludge, and is conventionally sent to the sewer, or otherwise thrown away, since the art deems it to have no value. The dissolved protein is not necessarily present as a true solution in the fatty oil, but may be present as an emulsion or a colloidal suspension. It cannot be separated from the fatty oil by filtration, but requires a high speed centrifuge to effect separation.

The fatty oil from the autoejector is normally hydrogenated to make shortening.

The present invention is directed to the utilization of the protein sludge, which at the present time is being discarded in large quantities as waste from edible fat rendering plants.

This invention has as an object the provision of a method whereby a useful proteinaceous flavoring agent is recovered from the aforesaid protein sludge.

This invention has as another object the provision of a proteinaceous flavoring agent which can be used in soup bases, or as a flavor enhancer for meat products, such as pot pies, hamburgers, sausages, and the like.

Other objects will appear hereinafter.

The present invention is directed to the processing of the protein sludge, namely the dissolved protein which remains in the fatty oil after the fatty oil has been processed in a superdecanter, but which is separated from the fatty oil by an autoejector subsequent to the separation in the superdecanter.

The protein sludge consists of the aforesaid water soluble protein and water.

In accordance with the process of the present invention, the protein component of the protein sludge is hydrolyzed with hydrochloric acid. This is preferably effected in a glass-lined pressure vessel. The concentration of hydrochloric acid to the protein sludge should be equivalent to that equal to a mixture of 250 pounds of 31.6 weight percent hydrochloric acid (about 10 Normal hydrochloric acid) and about 3,000 to 3,300 pounds of protein sludge. The duration of treatment with the aforesaid ratios of hydrochloric acid to protein sludge should be equivalent to a treatment of between about 5 to 7 hours at a steam pressure of about 18 to 22 pounds per square inch gauge. Preferably, the duration of hydrolysis treatment should be about 6 hours at a steam pressure of about 20 pounds per square inch gauge (a temperature of about 259° F.).

After the release of the steam pressure in the pressure vessel, a concentrated aqueous solution of sodium hydroxide should be added to the hydrolyzed protein sludge to raise its pH to the order of about 3 to about 5. The so-treated solution is then filtered, as by means of a filter press, to remove any solids which have been released as a result of the aforementioned treatment. Such solids are discarded.

The filtered solution is passed to a separation tank, where it stands until it separates into two layers. The upper layer is the fatty oil layer, and the lower layer is the aqueous layer.

The aqueous layer is separated and transferred to another tank, where its solution is adjusted to a pH of between 4.7 to 5.2 Such adjustment may not be necessary if this pH range was reached during the partial neutralization with the sodium hydroxide. If it was not reached, then additional sodium hydroxide is added to the solution to attain this pH.

The aqueous solution is then steam distilled to drive off water to a level of about 45 to 55 weight percent of solute. I have found that concentrating the aqueous solution to this level is essential if a satisfactory product is to be obtained.

The concentrated aqueous solution containing between about 45 to 55 weight percent of solute is allowed to settle, as by standing for a period of 8 to 17 or more hours. The solution is then again filtered, and the solids removed by filtration are discarded.

The solution can then be used as a proteinaceous flavoring agent. By way of example, it can be diluted to a 42 weight percent level. At this concentration level, I have found that it is an excellent proteinaceous flavoring agent when used in soups in a concentration of 2 ounces of the proteinaceous flavoring agent per 1000 pounds of soup. Alternatively, it can be used as a flavoring agents in hamburger, as in a concentration of 3 ounces of this 42 weight percent solution per 200 pounds of hamburger.

Alternatively, if desired, the solution can be vacuum dried to a powdery state, and stored as such.

The significant stage is the removal of solids by concentrating the aqueous solution having a pH of 4.7 to 5.2 to a solute concentration of 45 to 55 weight percent. I have found that by effecting this concentration, there is a separation of undesirable contaminant when the solution is allowed to stand as set forth above.

The fatty oil which is separated before the adjustment of the pH to about 4.7 to 5.2 can be processed as is now conventionally done, namely it can be sold as inedible tallow and used in soaps, and lubricants.

It is desirable that glass-lined equipment be used to effect the entire process in order to avoid metallic contamination.

The process of the present invention enables valuable proteinaceous flavoring agents to be derived from protein sludge, which would otherwise be discarded.

The present invention may be embodied in other specific forms without departing from the spirit or essential attributes thereof and, accordingly, reference should be made to the appended claims, rather than to the foregoing specification as indicating the scope of the invention.

It is claimed:

1. A process for forming a proteinaceous flavoring agent from the protein sludge derived from a low temperature edible beef fat-rendering process which includes hydrolyzing the protein sludge with hydrochloric acid at a steam pressure of about 18 to 22 pounds per square inch gauge for a time period of about 5 to 7 hours, with the concentration of the hydrochloric acid being equivalent to about 250 pounds of 31.6 weight percent hydrochloric acid per 3,000 to 3,300 pounds of protein sludge, partially neutralizing the hydrolyzed protein sludge to a pH of about 3 to about 5 with sodium hydroxide, filtering the partially neutralized hydrolyzed protein sludge, separating the filtrate into a fatty oil layer and an aqueous hydrolyzed protein layer, removing the fatty oil layer, adjusting the pH of the remaining aqueous hydrolyzed protein solution to between about 4.7 to 5.2 unless said remaining aqueous hydrolyzed protein solution already has a pH of about 4.7 to 5.2 condensing the so-adjusted aqueous hydrolyzed protein solution to a 45 to 55 weight percent solute solution, allowing said 45 to 55 weight percent solute solution to stand for at least 8 hours whereby solids precipitate therefrom, and filtering said precipitated solids from said 45 to 55 weight percent solute solution to yield a solution of a proteinaceous flavoring agent.

* * * * *